Jan. 16, 1951 M. N. FAIRBANK 2,538,511
PHOTOGRAPHIC APPARATUS
Filed May 13, 1948 2 Sheets-Sheet 1

INVENTOR
Murry N. Fairbank
BY Donald L. Brown
and
Oliver W. Hayes
Attorneys

Jan. 16, 1951  M. N. FAIRBANK  2,538,511
PHOTOGRAPHIC APPARATUS
Filed May 13, 1948 2 Sheets-Sheet 2
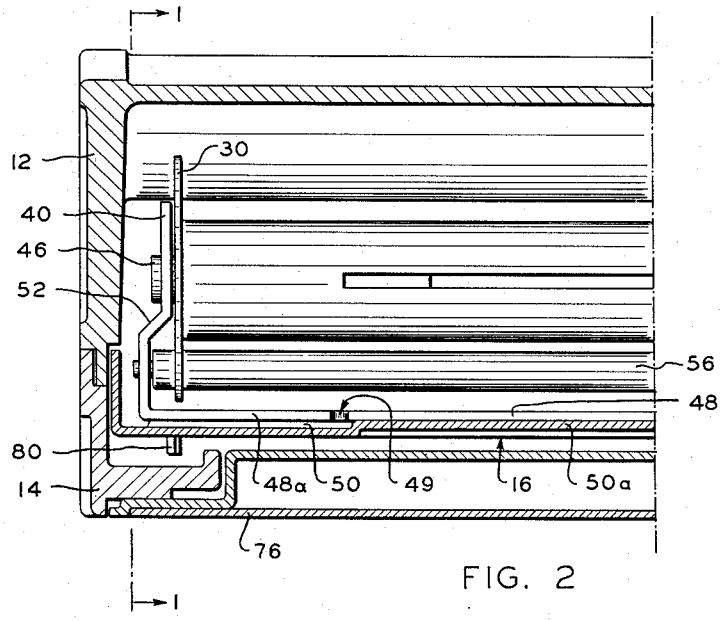
FIG. 2
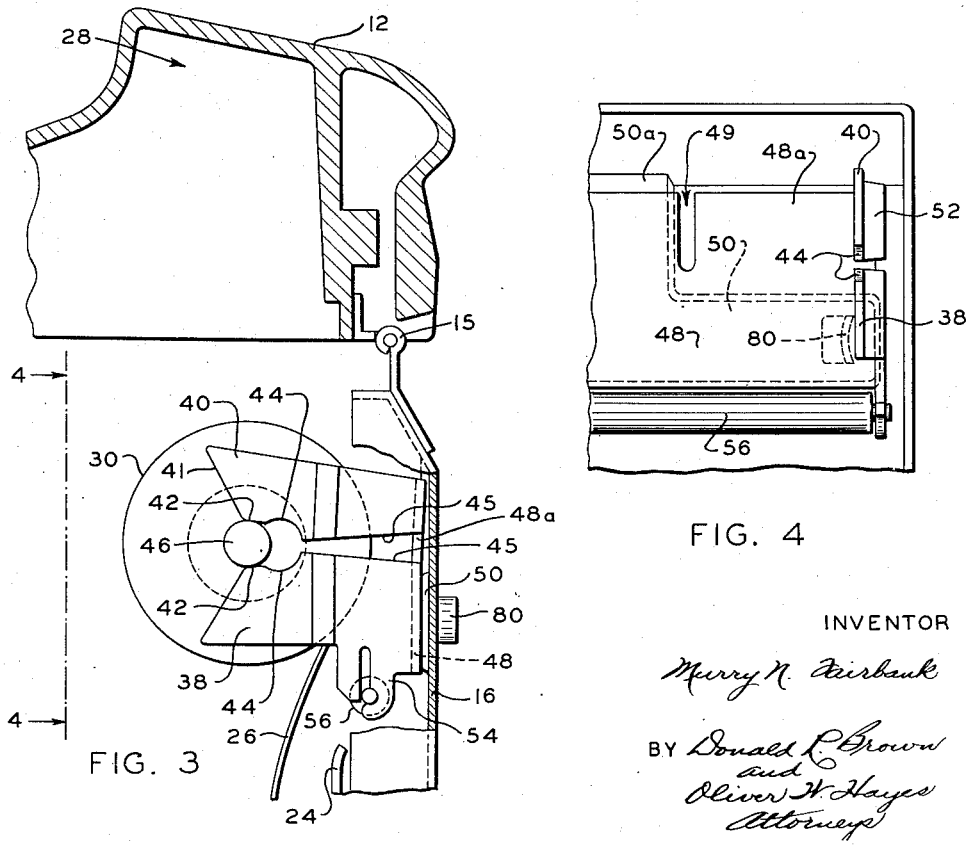
FIG. 3
FIG. 4
INVENTOR
Murry N. Fairbank
BY Donald L. Brown
and
Oliver W. Hayes
Attorneys Patented Jan. 16, 1951

2,538,511

UNITED STATES PATENT OFFICE 2,538,511

PHOTOGRAPHIC APPARATUS

Murry N. Fairbank, Belmont, Mass., assignor to Polaroid Corporation, Cambridge, Mass., a corporation of Delaware Application May 13, 1948, Serial No. 26,800

5 Claims. (Cl. 95—13)

This invention relates to photography and more particularly to novel photographic apparatus which is an improvement over that shown in Patent No. 2,435,717, which patent shows a photographic apparatus, such as a camera, wherein negative and positive sheets may be separately mounted in the camera, and negative and positive images may be concurrently produced in the two sheets by bringing said two sheets into face-to-face relation and releasing a liquid from one of said sheets and spreading said liquid between the two sheets.

A principal object of the present invention is to provide improved means for mounting a spool carrying the roll of photosensitive sheet.

Other objects of the invention are to provide a camera of the above type permitting easy loading and removal of the photosensitive film spool; to provide a camera which accurately positions this spool; to provide a simplified construction of such a camera and to reduce the cost of such a camera while increasing its reliability of operation.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is a sectional view of Fig. 1 taken along the line 2—2;

Fig. 3 is a fragmentary sectional view of the invention of Fig. 1 with the rear housing removed and the partition member swung partially open with the spool partially inserted in the holder; and Fig. 4 is a plan view of the spool holder and partition member looking in the direction 4—4 of Fig. 3, with the film spool removed.

Figure 1:
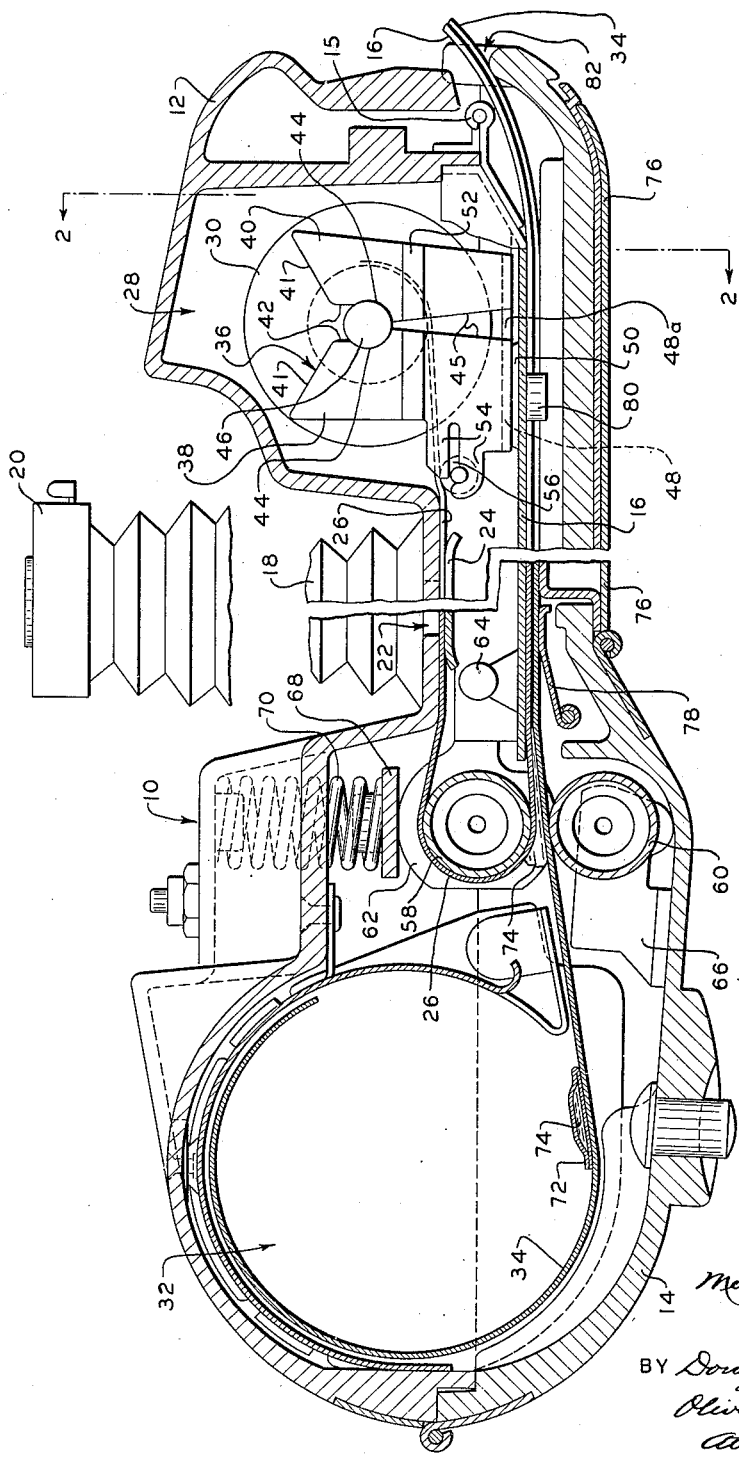
Figure 1 is a diagrammatic fragmentary sectional view of one preferred modification of the invention shown in the form of a hand-held camera, the right-hand portion of Fig. 1 being a section along line 1—1 of Fig. 2 and the left-hand portion of Fig. 1 being a section along the center of the camera.

In general, this invention relates to cameras of the type comprising means for holding a roll of photosensitive sheet such as a commercial silver halide photosensitive film, means for exposing sequential areas of the photosensitive film and means for processing the exposed silver halide area to at least develop a negative image therein, by spreading a processing liquid between the exposed area and another sheet also supplied by the camera. This second sheet preferably supports a plurality of liquid-carrying containers at spaced intervals on one surface thereof, this surface being brought into face-to-face relation with the exposed image area of the silver halide photosensitive film and the processing being accomplished by passing the thus superposed film and sheet between a pair of pressure rolls carried by the camera to cause the release and spreading of the liquid between corresponding areas of the film and sheet. The above processing preferably produces a positive image on the second sheet and this latter sheet is hereinafter referred to as a positive image-receiving sheet. The present invention is more particularly directed to improvements in the means for holding the spool of photosensitive film. These improvements are accomplished by several features of the invention involving the positioning of the spool-holding means and the construction thereof hereinafter described.

In the preferred form of camera embodying the present invention, there is preferably included a front housing carrying a lens and shutter assembly, a rear housing and a partition member between these housings, the partition member being preferably hinged to the front housing. The partition member defines an exposure chamber with the front housing and defines a dark chamber with the rear housing. The two housing members preferably provide a positive sheet-holding chamber between portions thereof. A pair of processing means, preferably a pair of pressure rolls, are included in the camera, one of the rolls being preferably carried by an end of the partition member and the other being preferably carried by the rear housing. A portion of the front housing is preferably enlarged to provide a space within which the spool of photosensitive film may be positioned. A spool holder is provided on the partition member and so holds the spool therein that, upon movement of the partition into operative relationship with the front housing, the spool is positioned within the space formed by the enlarged portion of the front housing. The spool holder preferably comprises a U-shaped member having bifurcated legs and a connecting yoke secured to the partition member. Each of said bifurcated legs preferably comprises a pair of coplanar arms defining therebetween a slot having a widened circular portion in which the spindle of the spool may be held. The plane of the two arms of a pair is preferably normal to the spool axis and normal to the plane of the partition member while the connecting yoke is parallel to the plane of the partition member. This yoke is preferably so related to the partition member as to increase the resilience of one of the arms of each pair. Thus, when the spindle is inserted in the slot between these two arms, one of the arms is readily moved within its plane until the spindle reaches the widened circular portion of the slot, allowing the arm to move back to its original position and thus to lock the spool in place.

Referring now to Fig. 1 there is shown one preferred form on the invention as embodied in a hand-held camera. In this figure, 10 represents the camera generally, the camera being shown as comprising a front housing 12, a rear housing 14 and a partition member 16, hingedly connected at 15 to front housing 12. The front housing supports a usual bellows 18 carrying a lens and shutter assembly schematically indicated at 20. For defining an exposure opening there is provided a hole 22 in front housing 12. Behind opening 22 there is positioned a backing plate 24 carried by the partition 16, the backing plate holding an area of a photosensitive film 26 in the focal plane of the camera. At one end of front housing 12 there is provided an enlarged portion defining a space 28 in which a spool 30 carrying the film may be positioned. At the other end of the front housing is a second enlarged portion defining a space 32 in which a coil of a receiving sheet 34 may be positioned.

For holding spool 30 there is provided a spool holder indicated generally at 36, this holder preferably comprising a U-shaped element having a yoke and two spool-end-engaging legs, one leg for each end of the spool. Reference to Figs. 2, 3 and 4, where like numbers refer to like elements, is helpful in an understanding of the construction shown. Each spool-engaging leg is preferably normal to partition 16 and comprises two coplanar arms indicated at 38 and 40. A slot between these arms is defined by facing edges of the arms 38 and 40, these being indicated at 42, 44 and 45. Edges 42 are substantially parallel, edges 44 are circular and edges 45 taper away from each other. The top portions 41 of arms 38 and 40 preferably define a wedge for guiding a spindle 46 of spool 30 into position (see Fig. 3), to be forced down into the slot defined by edges 42 until the spindle reaches the circular portion of the slot defined by edges 44. Arms 38 and 40 are preferably formed from a single sheet of metal having a connecting yoke 48 with which arms 38 and 40 are integrally connected. Yoke 48 preferably is parallel to partition 16 and that part 48a thereof, carrying arm 40, is spaced from partition 16. This spacing is accomplished, in the preferred construction, by providing a ridge 50 on the surface of partition 16. As seen best in Fig. 4, ridge 50 is preferably T-shaped, the leg of the T being shown at 50a. The major portion of the yoke 48 is fixedly secured to the upper surface of ridge 50—50a such as by spot welding. This leaves the right-hand end portion 48a of yoke 48, which supports arm 40, free for movement (as shown in Fig. 3) towards partition 16 under a bending stress applied thereto by a force exerted on arm 40. The outwardly tapering slot 45 between two arms 38 and 40 provides a relatively wide transverse area of yoke portion 48a which is capable of flexing over a large area, thereby having considerable flexibility. This arrangement permits the spool holder to be made of a relatively heavy stock, to provide the necessary structural rigidity, while permitting sufficient flexibility of portions thereof to provide for easy insertion and removal of the spool. A pair of slots 49 (see Fig. 4), extending partially across yoke 48, isolate the two portions 48a, supporting arms 40, from the central portion of the yoke secured to ridge 50a, to facilitate the flexing of the unsupported portions 48a of the yoke.

As can be seen more clearly from Fig. 2, each of arms 38 and 40 preferably has an inclined intermediate portion 52 which holds upper portions of each arm in a plane spaced inwardly of the plane of the lower portions. This spacing decreases the area of these arms which can contact the flange on the spool and accurately positions the spool transversely of the camera. Arm 38 of the spool holder also preferably includes a means for supporting the photosensitive layer as it is unrolled from the spool. In a preferred form, this supporting means comprises a roll 56 which is suitably secured to the spool holder, such as by means of a pair of forwardly extending arms shown at 54 which engage one end of roll 56 and maintain the roll 56 fixed with respect to the focal plane when the partition 16 is in its closed position. Roll 56 guides the photosensitive film into the focal plane of the camera at such an angle that back tension on the film does not rock the backing plate 24.

For accomplishing the processing of the exposed area of photosensitive film 26 there is provided a processing means shown, in a preferred form, as comprising a pair of pressure rolls 58 and 60. Roll 58 is carried by a pair of arms 62 supported by a hinge 64 secured to partition 16. Roll 60 is preferably carried by a support 66 secured to rear cover 14. For applying a resilient load to rolls 58—60 there is preferably provided a pressure member 68 bearing on arms 62 and under a spring pressure due to a spring 70. A preferred form of receiving sheet 34 includes a container 72 on one surface thereof, this container carrying a processing liquid 74 therein, this liquid being preferably viscous and comprising an alkaline aqueous solution of a developer, a film-forming material and a silver halide solvent.

When this viscous liquid is released and spread between the film and receiving sheet it laminates these two elements together and concurrently forms a negative in the film and a positive on the receiving sheet. This processing takes places in the dark chamber defined by the rear housing 14 and the partition member 16. For permitting access to the dark chamber to remove the finished positive there is provided a door 76. When the door is opened a light seal blade 78 prevents passage of light to the pressure roll portion of the camera. For guiding the film in the dark chamber there is included a pair of tabs 80 stamped out of partition 16 and bent perpendicularly thereto. As can be seen best in Fig. 4, a portion of the yoke 48 of the spool holder covers the hole left by punching out the tab 80 and thus prevents light from passing to unexposed film when the door 76 is opened. Suitable other light seals and latches are provided for maintaining the light-tightness of the camera interior.

In the use of the camera described above, the rear housing 14 is swung open, thus allowing the partition 16 to be swung open as shown in Fig. 3. The spool 30 is then placed in the spool holder by placing the spindle 46 adjacent one of the tapered edges 41 and pushing the spool towards the partition 16, the tapered edge guiding the spindle into the slot defined by the two edges 42. As the spindle enters the slot it, being wider than the slot, forces arm 40 to the right, rotating it around the unsupported portion 48a of yoke 48, this movement of arm 40 being shown most clearly in Fig. 3. As the spindle 46 passes through the slot 42 and reaches the circular slot defined by edges 44, arm 40 swings back to its original position, thus locking the spool in place. A leader portion of the film is then led across roll 56, across backing plate 24, placed between the two arms 62 and led around pressure roll 58 carried by arms 62. The partition member 16 is then swung to the position shown in Fig. 1, the spool of film occupying the space 28 therefore. The coil of receiving sheet is now placed in the cylindrical space 32 therefor and a leader portion of the receiving sheet, preferably secured to the film leader, is aligned with the film leader, these two leaders being fed along the back of partition 16, between tabs 80, carried by the partition, and past the right-hand end of the camera. The rear housing is now swung to closed position, thus forming the dark chamber with the partition, bringing roll 60 into operative relationship with roll 58, and forming a mouth 82 with the front housing, the leader portions of the film and sheet extending through the mouth 82.

An unexposed frame of film 26 is now moved to exposure position behind opening 22, a corresponding area of receiving sheet being advanced so as to be superposable with the exposed film area, the proper position of these areas being preferably accomplished by a stop of the type shown in the copending application of Murry N. Fairbank, Serial No. 15,138, filed March 16, 1948. After exposure the two sheets are advanced, the container 72 preceding the exposed film area and the corresponding receiving sheet area between the pressure rolls, these rolls releasing liquid 74 from the container and spreading it uniformly between these two areas to laminate these areas together and to develop the above-described negative and positive images. At the conclusion of the processing, after about a minute, the door 76 is opened and that portion of receiving sheet 34 containing the positive image is separated from the lamination, this separation being preferably aided by perforations surrounding the positive image area. This processing movement preferably moves the succeeding film area into exposure position and this succeeding area may be processed, after exposure, by pulling those portions of the preceding film and receiving sheet extending from mouth 82.

While a preferred construction of film-holding means, having numerous advantages of simplicity and cheapness of manufacture, has been shown, a number of modification thereof are feasible within the scope of the invention. For example ridge 50 on partition 16 can be a washer or other spacing means. Equally, ridge 50 can be eliminated if the portion 48a of yoke 48 is in a higher plane than the remainder of yoke 48. Such a modification of the invention may be accomplished, for example, by bending the portion 48a of yoke 48 upwardly or by forming yoke 48 of two separate pieces, the portion 48a being placed over the other portion. Equally, partition 16 may be dished out so as to leave a space below the yoke portion 48a to permit bending of portion 48a. Similarly, the ridge 50 can extend under the center line of yoke 48, thus allowing both arms 38 and 40 to be bent to the side. Equally, the left side of yoke 48 can be unsupported, thus allowing left arm 38 to move while arm 40 remains stationary. For ease of assembly, yoke 48 extends completely between the two pairs of arms 38 and 40. However, this yoke may comprise two separate pieces, one for supporting each pair of arms, in which case that portion of the yoke 48 between the two slots 49 can be eliminated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera of the class wherein a photosensitive sheet material is exposed and is then processed in conjunction with another sheet material by being superposed with said other sheet material between a pair of pressure-applying members, the combination with said pressure-applying members of means for operatively mounting said members as well as a spool of said photosensitive sheet material and a coreless coil of said other sheet material, said mounting means comprising a main camera housing, a door at the rear of said housing hingedly secured to said housing, a partition mounted within the interior of said housing and hingedly attached to said housing at a point opposite the point of attachment of said rear door, said main camera housing, said partition and said rear door when in closed operative position forming a first dark chamber for exposure of said photosensitive sheet material and a second dark chamber for receiving the photosensitive sheet material after it has been superposed with said other sheet material, spool-holding means for mounting a spool of said photosensitive sheet material, said spool-holding means being attached to said partition on the side thereof adjacent to said first dark chamber and adjacent the point at which said partition is hinged to said main camera housing, and means cooperating with said main camera housing and said rear door to provide a chamber for receiving the coreless coil of said other sheet material, said coil-receiving chamber being located adjacent the hinge for said rear door, one of said pressure-applying members being mounted on said partition adjacent the free end of said partition and the other of said pressure-applying members being mounted on said rear door, said partition and said rear door when swung into open position rendering accessible said spool-holding means and said coil-receiving chamber and separating said pressure-applying members whereby a spool of said photosensitive sheet material and a coil of said other sheet material may be readily loaded into the camera.

2. In a camera of the class wherein a photosensitive sheet material is exposed and is then processed in conjunction with another sheet material by being superposed with said other sheet material between a pair of pressure-applying members, the combination with said pressure-applying members of means for operatively mounting said members as well as a spool of said photosensitive sheet material and a coreless coil of said other sheet material, said mounting means comprising a main camera housing, a door at the rear of said housing hingedly secured to said housing, a partition mounted within the interior of said housing and hingedly attached to said housing at a point opposite the point of attachment of said rear door, said main camera housing, said partition and said rear door when in closed operative position forming a first dark chamber for exposure of said photosensitive sheet material and a second dark chamber for receiving the photosensitive sheet material after it has been superposed with said other sheet material, spool-holding means for mounting a spool of said photosensitive sheet material, said spool-holding means being attached to said partition on the side thereof adjacent to said first dark chamber and adjacent the point at which said partition is hinged to said main camera housing, and means cooperating with said main camera housing and said rear door to provide a chamber for receiving the coreless coil of said other sheet material, said coil-receiving chamber being located adjacent the hinge for said rear door, one of said pressure-applying members being mounted on said partition adjacent the free end of said partition and the other of said pressure-applying members being mounted on said rear door, said partition and said rear door when swung into open position rendering accessible said spool-holding means and said coil-receiving chamber and separating said pressure-applying members whereby a spool of said photosensitive sheet material and a coil of said other sheet material may be readily loaded into the camera, said coil-receiving chamber and said spool-holding means so mounting said coil and said spool that the axes thereof are parallel to the axes of said pressure-applying members when the main camera housing partition and rear door are in closed operative position.

3. In a camera of the class wherein a photosensitive sheet material is exposed and is then processed in conjunction with another sheet material by being superposed with said other sheet material between a pair of pressure-applying members, the combination with said pressure-applying members of means for operatively mounting said members as well as a spool of said photosensitive sheet material and a coreless coil of said other sheet material, said mounting means comprising a main camera housing, a door at the rear of said housing hingedly secured to said housing, a partition mounted within the interior of said housing and hingedly attached to said housing at a point opposite the point of attachment of said rear door, said main camera housing, said partition and said rear door when in closed operative position forming a first dark chamber for exposure of said photosensitive sheet material and a second dark chamber for receiving the photosensitive sheet material after it has been superposed with said other sheet material, spool-holding means for mounting a spool of said photosensitive sheet material, said spool-holding means being attached to said partition on the side thereof adjacent to said first dark chamber and adjacent the point at which said partition is hinged to said main camera housing, and means cooperating with said main camera housing and said rear door to provide a chamber for receiving the coreless coil of said other sheet material, said coil-receiving chamber being located adjacent the hinge for said rear door, one of said pressure-applying members being mounted on said partition adjacent the free end of said partition and the other of said pressure-applying members being mounted on said rear door, said partition and said rear door when swung into open position rendering accessible said spool-holding means and said coil-receiving chamber and separating said pressure-applying members whereby a spool of said photosensitive sheet material and a coil of said other sheet material may be readily loaded into the camera, said second dark chamber being behind said first dark chamber and said pressure-applying members being mounted outside said chambers between the ends of the latter and said coil-receiving chamber when said housing, partition and door are in closed operative position.

4. In a camera of the class wherein a photosensitive sheet material is exposed and is then processed in conjunction with another sheet material by being superposed with said other sheet material between a pair of pressure-applying members, the combination with said pressure-applying members of means for operatively mounting said members as well as a spool of said photosensitive sheet material and a coreless coil of said other sheet material, said mounting means comprising a main camera housing, a door at the rear of said housing hingedly secured to said housing, a partition mounted within the interior of said housing and hingedly attached to said housing at a point opposite the point of attachment of said rear door, said main camera housing, said partition and said rear door when in closed operative position forming a first dark chamber for exposure of said photosensitive sheet material and a second dark chamber for receiving the photosensitive sheet material after it has been superposed with said other sheet material, spool-holding means for mounting a spool of said photosensitive sheet material, said spool-holding means being attached to said partition on the side thereof adjacent to said first dark chamber and adjacent the point at which said partition is hinged to said main camera housing, and means cooperating with said main camera housing and said rear door to provide a chamber for receiving the coreless coil of said other sheet material, said coil-receiving chamber being located adjacent the hinge for said rear door, one of said pressure-applying members being mounted on said partition adjacent the free end of said partition so that it is clear of the end of said partition and the other of said pressure-applying members being mounted on said rear door, said partition and said rear door when swung into open position rendering accessible said spool-holding means and said coil-receiving chamber and separating said pressure-applying members whereby a spool of said photosensitive sheet material and a coil of said other sheet material may be readily loaded into the camera, said second dark chamber being behind said first dark chamber and said pressure-applying members being mounted outside said chambers between the ends of the latter and said coil-receiving chamber when said housing, partition and door are in closed operative position.

5. In a camera of the class wherein a photosensitive sheet material is exposed and is then processed in conjunction with another sheet material by being superposed with said other sheet material between a pair of pressure rolls, the combination with said pressure rolls of means for operatively mounting said rolls as well as a spool of said photosensitive sheet material and a coreless coil of said other sheet material, said mounting means comprising a main camera housing, a door at the rear of said housing hingedly secured to said housing, a partition mounted within the interior of said housing and hingedly attached to said housing at a point opposite the point of attachment of said rear door, said main camera housing, said partition and said rear door when in closed operative position forming a first dark chamber for exposure of said photosensitive sheet material and a second dark chamber for receiving the photosensitive sheet material after it has been superposed with said other sheet material, spool-holding means for mounting a spool of said photosensitive sheet material, said spool-holding means being attached to said partition on the side thereof adjacent to said first dark chamber and adjacent the point at which said partition is hinged to said main camera housing, and means cooperating with said main camera housing and said rear door to provide a substantially cylindrical chamber for receiving the coreless coil of said other sheet material, said coil-receiving chamber being located adjacent the hinge for said rear door, one of said pressure rolls being mounted on said partition adjacent the free end of said partition so that it is clear of the end of said partition and the other of said pressure rolls being mounted on said rear door, said partition and said rear door when swung into open position rendering accessible said spool-holding means and said coil-receiving chamber and separating said pressure rolls whereby a spool of said photosensitive sheet material and a coil of said other sheet material may be readily loaded into the camera, said second dark chamber being behind said first dark chamber and said pressure rolls being mounted outside said chambers between the ends of the latter and said coil-receiving chamber when said housing, partition and door are in closed operative position.

MURRY N. FAIRBANK.

REFERENCES CITED

The following references are of record in the file of this patent:

UNITED STATES PATENTS

| Number | Name | Date |
| --- | --- | --- |
| 1,057,412 | Dey | Apr. 1, 1913 |
| 1,424,816 | Grillone | Aug. 8, 1922 |
| 1,819,848 | Simjian | Aug. 18, 1931 |
| 1,928,235 | Taylor | Sept. 26, 1933 |
| 2,017,979 | Mayo | Oct. 22, 1935 |
| 2,253,090 | Peterson | Aug. 19, 1941 |
| 2,336,279 | Mihalyi | Dec. 7, 1943 |
| 2,435,719 | Land | Feb. 10, 1948 |